UNITED STATES PATENT OFFICE.

FRANZ KOCH, OF BERLIN, GERMANY.

METHOD FOR THE PURIFICATION OF RAW WOOL.

1,117,194.  Specification of Letters Patent.  Patented Nov. 17, 1914.

No Drawing.  Application filed July 17, 1914. Serial No. 851,670.

*To all whom it may concern:*

Be it known that I, FRANZ KOCH, civil engineer and doctor of engineering, a subject of the German Emperor, and resident of Berlin, in the German Empire, have invented an Improved and Novel Method for the Purification of Raw Wool, of which the following is a specification.

The common methods of cleansing raw wool without subjecting the wool to the action or presence of water seek to accomplish this cleansing, so far as possible, by a single treatment.

Concerning the distribution, the deposition, and the composition of the substances present upon raw wool (wool-fat, sweat of sheep's wool soluble in water, and other impurities, such as excrements, dirt, thrust-off scales, and the like), but little is to be found in literature and even that little is largely incorrect. No method has hitherto been known for cleansing the wool of these substances during the working of the wool, without the employment of water.

I have discovered that the above substances which are soluble in water and consist chiefly of soap and salts, adhere in the form of small protuberances to the single or separate wool fibers. The protuberances are microscopic in size and of irregular outline; generally they resemble clubs, are jagged and adhere to the fiber at one point only, that is to say, they do not encircle the fiber. To the raw fat-containing wool the protuberances referred to are held and protected by means of a layer of wool fat covering the fiber as well as the little sweat bulbs, and this layer of fat serves to load the fiber also with other impurities, such as thrust-off scales and other particles of foreign matter, whereas particles of excrement and dirt adhere to and around the fiber tufts by their own inherent adhesiveness.

By my invention I remove substantially from the fibers, the layer of fat by any convenient method, preferably using a dissolvent having little or no tendency to dissolve salts and soaps; a suitable substance is ethylene trichlorid or dichlorid. If the removal of the fat is properly performed, the little sweat bulbs will be found to still adhere directly to the fibers after the fat has disappeared, and they may be easily separated therefrom with or without the co-application of a current of air by any convenient means, as by rubbing, combing, heating, drawing asunder the tufts and the like, or, in other words, by any well known process of dry washing, including the use of pulverulent material as kieselguhr, the impurities being removed together with and by the removal, in a dry process, of the kieselguhr or other similar substance. This employment of pulverulent material, especially the finely powdered ones, should not be confused with processes wherein a complete cleansing of the wool, with or without the use of a current of air, is effected by treating the raw, fat-containing wool with dry, fat absorbing materials of which kieselguhr is one.

In the practice of my improved process, the capacity of the dry substance used to dissolve or absorb the fat is immaterial because the fat has been removed previously and prior to the application of the material in question. This latter is made use of, if ever, then chiefly in connection with an air current in order to expedite the process.

My improved process acts at one and the same time to remove also other insoluble impurities which are caused to adhere to the fibers, partly by the wool fat and partly as excrement and dirt by their own adhesive tendency. These impurities may be almost completely removed from the fibers, by a dry process, by the mechanical treatment of the fat-freed wool as described.

In order to facilitate the cleansing process, the layer of fat covering the fibers, and the dissolvent must be thoroughly removed to such a degree that the fibers are entirely free from their original adhesiveness. Care should be taken to avoid softening the little bulbs during the step of removing the fat, either by superheating or moistening them, because such softening of the bulbs might cause them to adhere more tenaciously to the fibers and thus render their separation from the fibers by the mechanical treatment referred to, more difficult. On the other hand, it is essential that, while the wool fat and sweat substances must be well separated from the fibers, the bulbs are not, during this step of the process, crumbled off or otherwise separated therefrom.

The dust arising during the dry washing in question contains a large proportion of the wool sweat in a novel and solid form that is particularly well suited for further use or utilization. For instance, by extracting the dust as by subjecting it to the action of chemical substances, if the dissolvent or dissolvents have been properly used, one may separate the component parts of the residue, free of wool fat, and preserve them in technically applicable forms.

To more fully explain my proposed method, I will proceed to describe one way of carrying it out. A quantity of wool, for instance Hungarian sweat wool, is lixiviated with ethylene trichlorid or dichlorid, care being taken to avoid the foregoing described objectionable steps, and the desired result i. e. the dissolving practically of all of the wool fat will be obtained without difficulty. The quantity and temperature of the dissolvent, as well as the length of time of use of the same, if one of the above mentioned dissolvents is used, is practically unimportant. The dissolved fat still adhering to the wool fibers is removed by rinsing the fibers in a second quantity of the dissolvent after which the wool is dried in a current of gas, air, carbonic acid, or the like. The fibers may then be freed of the remaining impurities by means of a willower, shaker or any other of the machines commonly used in the wool industry for operations of this kind; the dust is carried away by a current of air. Finally the remaining impurities are removed by rinsing with water.

My improved method permits the separation of the three main components, namely, fibers, wool fat and wool sweat simultaneously with the treating of the raw wool and it affords for the first time means for economically working up the wool sweat without the inconvenience of the troublesome waste waters.

Having now described my invention, what I desire to secure by a patent of the United States is:

1. The method of purifying raw wool, consisting in first removing the fatty substances from the raw wool by a chlorinated hydrocarbon and then separating from the wool, by a dry mechanical treatment, the remaining impurities which are insoluble in said hydrocarbon, as set forth.

2. The method of purifying raw wool, consisting in first removing substantially the fatty substances from the raw wool by substantially ethylene dichlorid and then separating from the wool, by a dry mechanical treatment, the remaining impurities which are insoluble in said hydrocarbon, as set forth.

3. The method of purifying raw wool, consisting in first removing substantially the fatty substances from the raw wool by a chlorinated hydrocarbon and then separating from the wool, by a dry mechanical treatment, the wool sweat and the like, substantially as described.

4. The method of purifying raw wool, consisting in first removing substantially the fatty substances from the raw wool by a chlorinated hydrocarbon and then separating from the wool, by rubbing, beating, or an equivalent dry mechanical treatment, the remaining impurities which are insoluble in said hydrocarbon, as set forth.

In testimony whereof, I have signed my name to this specification in the presence of two subscribing witnesses.

Dr. Ing. FRANZ KOCH.

Witnesses:
Woldemar Haupt,
Henry Hasper.